US006873255B2

(12) United States Patent
Gallagher

(10) Patent No.: US 6,873,255 B2
(45) Date of Patent: Mar. 29, 2005

(54) APPLIANCE COMMUNICATION SYSTEM

(76) Inventor: Andrew C. Gallagher, 353 Campbell Rd., Brockport, NY (US) 14420

( * ) Notice: Subject to any disclaimer, the term of this patent is extended or adjusted under 35 U.S.C. 154(b) by 0 days.

(21) Appl. No.: 10/243,703

(22) Filed: Sep. 14, 2002

(65) Prior Publication Data

US 2004/0051636 A1 Mar. 18, 2004

(51) Int. Cl.[7] .................................................. H04Q 1/30

(52) U.S. Cl. .................. 340/531; 340/309.16; 340/679; 340/5.7

(58) Field of Search ................................ 340/531, 500, 340/539.1, 309.16, 679, 5.7, 539.22, 539.26, 539.18, 5.8; 379/102.01, 106.01; 700/1

(56) References Cited

U.S. PATENT DOCUMENTS

| | | | | | |
|---|---|---|---|---|---|
| 4,243,973 | A | | 1/1981 | Sandidge | 340/148 |
| 4,323,772 | A | | 4/1982 | Serge | 235/463 |
| 5,089,809 | A | * | 2/1992 | Carmichael, Jr. | 340/679 |
| 5,410,292 | A | | 4/1995 | Lee Van Su | 340/310.06 |
| 5,424,940 | A | * | 6/1995 | Ousborne | 700/1 |
| 5,506,892 | A | * | 4/1996 | Kojima et al. | 379/102.03 |
| 5,586,174 | A | * | 12/1996 | Bogner et al. | 379/106.01 |
| 5,757,643 | A | * | 5/1998 | Kuroda et al. | 700/9 |
| 5,910,776 | A | * | 6/1999 | Black | 340/10.1 |
| 5,987,105 | A | * | 11/1999 | Jenkins et al. | 379/106.01 |
| 6,121,593 | A | | 9/2000 | Mansbery et al. | 219/679 |
| 6,157,313 | A | * | 12/2000 | Emmermann | 340/5.42 |
| 6,275,922 | B1 | | 8/2001 | Bertsch | 712/36 |
| 6,405,261 | B1 | * | 6/2002 | Gaucher | 709/250 |
| 6,424,252 | B1 | * | 7/2002 | Adler | 340/311.2 |
| 6,466,134 | B1 | * | 10/2002 | Ahearn | 340/683 |
| 6,567,032 | B1 | * | 5/2003 | Mullaly et al. | 341/176 |
| 6,570,488 | B2 | * | 5/2003 | Kucharczyk et al. | 340/5.2 |

* cited by examiner

*Primary Examiner*—Phung Nguyen

(57) ABSTRACT

An appliance capable of performing a task initiated by a human operator, including an input device for receiving operator contact information for sending a message to the human operator; a computer for processing the operator contact information; and a transmitter that uses the operator contact information to communicate a message from the appliance to the human operator.

9 Claims, 5 Drawing Sheets

APPLIANCE COMMUNICATION SYSTEM

CROSS-REFERENCE TO RELATED APPLICATIONS

Not Applicable.

FIELD OF THE INVENTION

This invention relates to an appliance, such as a clothes washer, that accomplishes a task once initiated by a human operator.

BACKGROUND OF THE INVENTION

Among the many time saving devices in modern society are appliances that make performing household tasks easy. Many appliances perform operations that are initiated by a human operator, then run unaided until completion of the specific task. For example, the clothes washer, clothes dryer, and dishwasher are examples of such appliances. Even an oven (conventional or microwave) is an appliance that performs the task of heating food for a certain period of time.

It is often useful for the human operator to be notified when the appliance has completed its task. For example, when the clothes washer has finished washing the clothes, the human typically transfers the clothes from the clothes washer appliance to the clothes dryer appliance. There are many other scenarios whereby the human desires to be notified of the completion of the appliance's task.

It is common for an appliance to produce an audible sound when the task is complete. For example, in U.S. Pat. No. 4,243,973, Sandidge describes an integrated signal system for coordinating various signaling devices within a home environment. Unfortunately, the human may not hear or receive the signal. For example, the human may be outside and not hear the buzzer. An audible signal at a fixed location is inadequate to ensure that the human is notified when the appliance's task is complete. Another deficiency of an appliance having an audible signal is that the tone produced may not be able to be distinguished from that of other devices. For example, in a laundromat setting, all clothes washer appliances produce similar signals, therefore the human has difficulty knowing if her clothes washer appliance has finished its cycle, or if the signal was coming from another clothes washer appliance.

In U.S. Pat. No. 5,410,292, Le Van Suu describes a method for communicating information or commands within a dwelling or property. However, a human employing this method would still be unaware that a specific appliance completed its task.

In U.S. Pat. No. 5,424,940, Ousborne describes a computer controller for a laundromat to centralize money collection and control the activation of each appliance in the laundromat. Ousborne does not describe the problem of notifying the human that the appliance has completed its task.

In U.S. Pat. No. 5,987,105, Jenkins and Rhodes describe a home appliance, such as a laundry washing machine or refrigerator including a buzzer designed to sound an alarm or provide an audible indication of a certain condition. The appliance may transmit information (such as diagnostic or fault codes and appliance usage information) to a remote service center without the need for a physical connection to a telephone line. The buzzer may be controlled to produce audible tones in a predetermined format that can be transmitted from the appliance, through the air and down a telephone line through a telephone handset to the service center. The signal is recorded at the service center and the data extracted. The data is then analyzed to obtain the fault and/or usage information. The information described by Jenkins and Rhodes is used for machine diagnostics in order to notify a technician of a machine fault. Their appliance does not notify a human that the appliance has completed its task.

U.S. Pat. Nos. 6,121,593 and 6,275,922 both describe appliances that are controlled over the internet. Neither of these patents describes the problem of notifying the human that the appliance has completed its task.

Therefore, heretofore known appliances suffer from the limitation that the human operator is not notified when an appliance has completed its task in a manner that is not restricted to the audible range of the appliance itself.

SUMMARY OF THE INVENTION

It is an object of the present invention to provide an appliance that communicates with a human operator, notifying the human operator when the appliance's task is complete.

This object is met according to the present invention by an appliance capable of performing a task initiated by a human operator, including an input device for receiving operator contact information for sending a message to the human operator; a computer for processing the operator contact information; and a transmitter that uses the operator contact information to communicate a message from the appliance to the human operator.

The inventive appliance has the advantage that it permits a human operator to travel some distance from the appliance and be notified of the completion of the task. In addition, the inventive appliance has the advantage that the contents of the appliance will be secured by a locking door while the human is not in close proximity to the appliance.

DETAILED DESCRIPTION OF THE INVENTION

Figure 1:
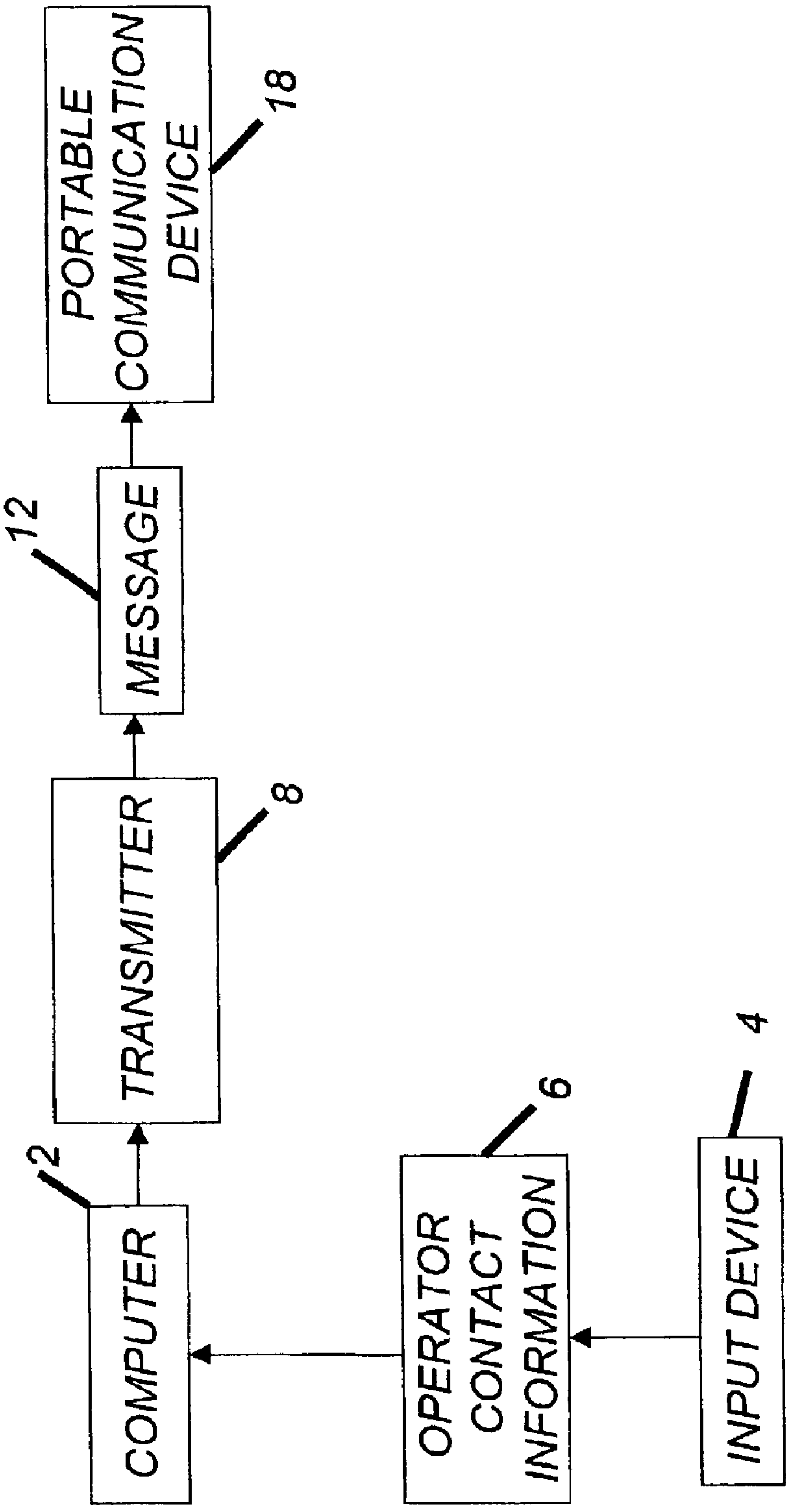
FIG. 1 is a block diagram illustrating one embodiment of the present invention.

FIG. 1 shows a diagram of the inventive appliance. Appliances perform operations that are initiated by a human operator, then run unaided until completion of the specific task. The appliance has a computer 2 to facilitate notifying the human when the appliance is either done with its task or nearly done with its task. The computer 2 monitors and/or controls the progress of the appliance's task. In the preferred embodiment the appliance is a clothes washing machine. Those skilled in the art will recognize that the inventive appliance could be any of a number of appliances designed for performing specific finite-length tasks, including but not limited to: a clothes dryer, a microwave oven, a conventional oven, a bread-making machine, or a toaster. For the purpose of this description, an appliance is considered to be a machine into which a human operator places one or more objects, and the appliance then performs a finite duration task on the objects.

The appliance has an input device 4 so that the human can input operator contact information 6. The input device 4 can take many commonly known forms that computers use to receive data from a human. For example, the input device 4 could be a bar code reader (for example U.S. Pat. No. 4,323,772), and the operator contact information 6 could be in the form of a printed bar code. Or, the input device could be a conventional keypad, either with or without a video monitor for feedback to the human. The input device could also be a touch-screen. The input device 4 is simply an apparatus that is used by a human so that the operator contact information 6 can be made known to the computer 2. Preferably, the input device 4 is a magnetic stripe reader as is commonly used to read information from cards containing magnetic stripes, such as credit cards or identification cards.

The operator contact information 6 is information that allows the appliance to contact the human operator. Preferably, the operator contact information 6 is a telephone number. Alternatively, the operator contact information could be a radio frequency, a URL of the Internet, an email address, or the like. In addition to the operator contact information, additional information of an operator identification number is optionally input to the computer 2 using the input device 4. The computer 2 processes the operator contact information by acquiring the operator contact information from the input device 4 and storing the operator contact information in memory.

Figure 2:
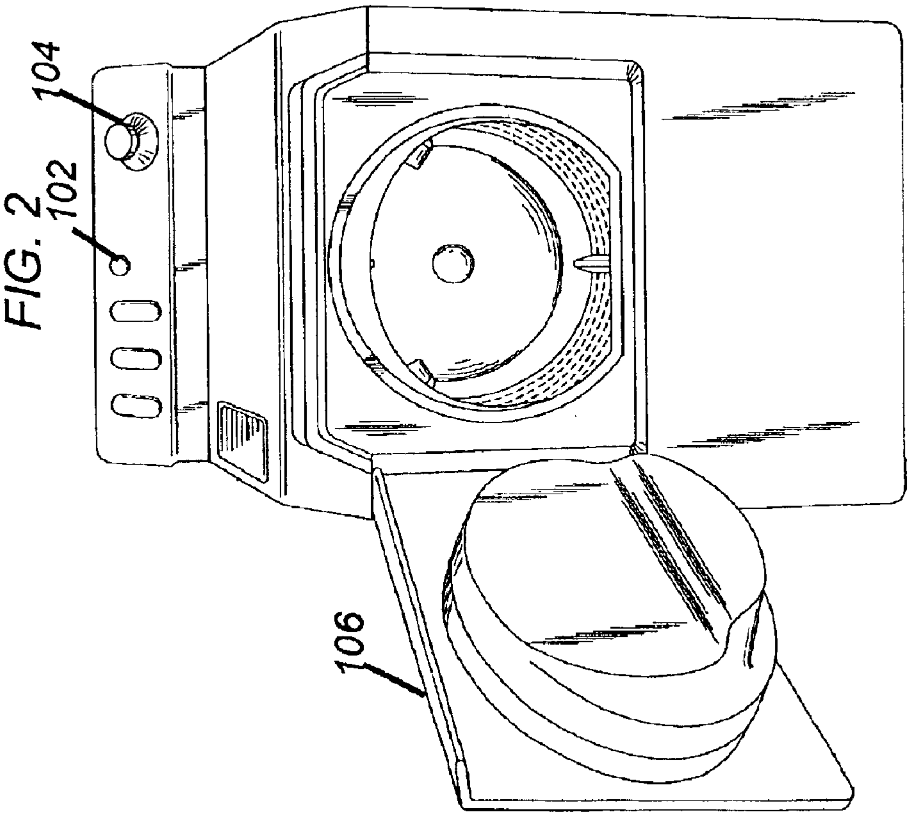
FIG. 2 is a view of an appliance according to the invention.

The human operator initiates the operation of the appliance by any method known in the art. The human operator can begin the appliance's task by setting a desired operating mode and then pressing a start button. For example, when the appliance is a clothes washer, as shown in FIG. 2, the human operator may begin the appliance's task with a start button 102. In addition, the human operator may select an operating mode such as "delicate" with a dial 104. Making a selection with the dial 104 also may also start the clothes washer.

Referring again to FIG. 1, the computer 2 keeps track of the appliance's progress. At a predetermined time relative to the duration of the appliance's task or point of progress at completing the appliance's task, the appliance's computer 2 communicates a message 12 to the human operator via the transmitter 8. The predetermined time is preferably the completion of the task. However, the predetermined time could also be a specific time interval before the completion of the task. For instance, the computer 2 could initiate the transmission of the message 12 to contact the human operator 3 minutes before the appliance's task is completed. This would allow the human operator to wander some distance from the appliance as it executes its task, and then have time to return to the appliance when the appliance's communicative message 12 is received. Likewise, the predetermined time may be a specific time interval after the task is initiated, or at a predetermined point of progress of the task (e.g. when the appliance is a clothes washer, the message 12 could be transmitted when the clothes washer enters the final spin cycle.) Or, the predetermined time could be a combination of the aforementioned items.

At the predetermined time, the computer 2 sends a message 12 to the human operator. The purpose of the communicative message 12 is to let the human operator know the progress (or conclusion or impending conclusion) of the appliance's task. To send the message 12 from the appliance to the human operator, the computer 2 uses a transmitter 8 that sends a message 12 to a portable communication device 18 that the human operator keeps physically close enough so that he or she will notice when the portable communication device 18 receives an incoming message. The transmitter 8 sends the message 12 to the portable communication device 18 across a communication channel, as is commonly known in the art. Preferably, at least a portion of the communication channel is wireless.

The portable communication device 18 is a lightweight device that the human operator can carry containing means for receiving a communicative message 12. In the preferred embodiment, the portable communication device 18 is a cellular telephone and the operator contact information 6 is a telephone number. The transmitter 8 is a telephone connection (either traditional or wireless) or modem that, at the predetermined time, places a call to the human operator's cellular telephone. Preferably, the message 12 is a recorded human voice indicating the status of the appliance's task. An example message 12 that could be sent to a portable communication device 18 that is a cellular telephone is a pre-recorded or computer synthesized voice that says "Your clothes are now clean." Alternatively, the message 12 may be a text message or simply some signal, such as lighting an LED on the portable communication device 18 that the human operator interprets as indicating that the appliance's task at a predetermined time relative to the duration of the appliance's task.

Alternatively, the communication from the appliance's computer 2 to the human operator's portable communication device 18 is performed via the Internet. In this embodiment, the transmitter 8 allows the message 12 to be placed via file transfer protocol (FTP) at certain Internet address URL. The portable communication device 18 could be a second computer. In this case, the second computer could simply monitor a specific URL for a message 12 from the appliance. In an alternative embodiment, the transmitter 8 emails the message 12. The emailed message 12 could then be received by the portable communication device 18 by any of those methods known in the art. In this embodiment, the portable communication device 18 could be a pager, cellular telephone, or computer, as it is common for these devices to receive email.

In an additional alternative embodiment, the transmitter 8 broadcasts a radio signal. The portable communication device 18 is then a radio signal receiver that receives the radio signal and emits a sound alarm, a visual alarm such as a blinking light emitting diode, or provides a tactile signal such as a vibration signal, or provides some combination thereof. In this case, the portable communication device 18 may be designed to specifically only receive messages 12 from a specific appliance's transmitter 8. The portable communication device 18 is preferable physically located with the appliance when the appliance is not performing a task. However, the human operator upon initiating the appliance's task takes the portable radio signal receiver, and will be notified by receiving a message 12 at the predetermined time from the appliance.

Figure 3:
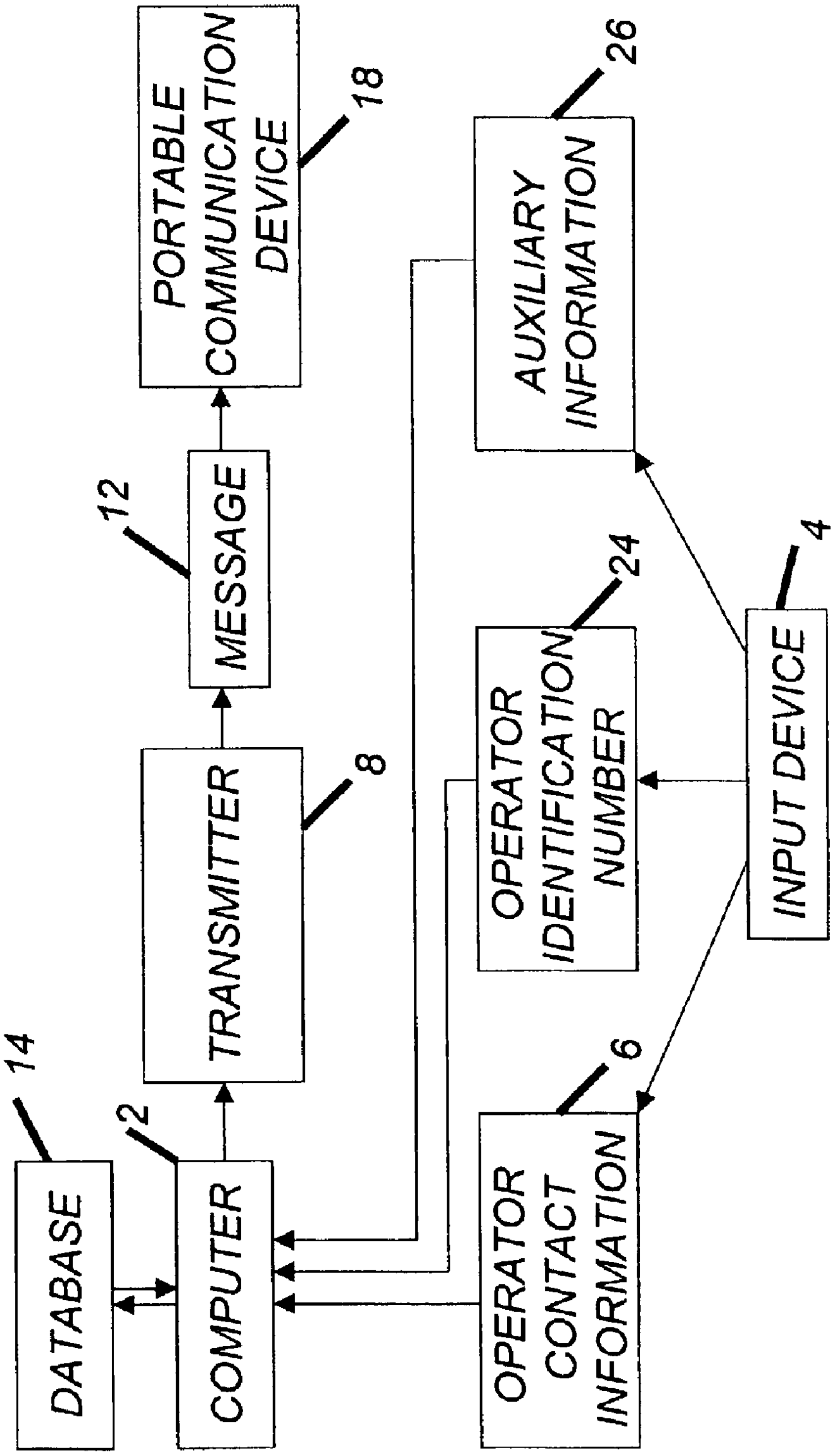
FIG. 3 is a block diagram illustrating an alternative embodiment of the present invention.

FIG. 3 shows an alternative embodiment of the present invention. In this embodiment, the input device 4 transmits information to a computer 2 that has an associated database 14. Upon using the appliance for the first time, the human operator supplies operator contact information 6. The operator contact information 6 is then stored in a database 14, and the operator contact information is associated with an operator identification number 24. In the future, the human operator need only supply the operator identification number 24 via the input device 4. The computer 2 then searches the database 14, and retrieves the operator contact information 6 that is associated with the operator identification number 24. It is possible that the operator identification number 24 is identical with the operator contact information 6 (for example a telephone number.)

Through the input device 4, the human operator optionally can also input auxiliary information 26. This auxiliary information could indicate the predetermined time for the computer 2 to contact the human operator. The remaining elements of the inventive appliance function as previously described with reference to FIG. 1.

Figure 4:
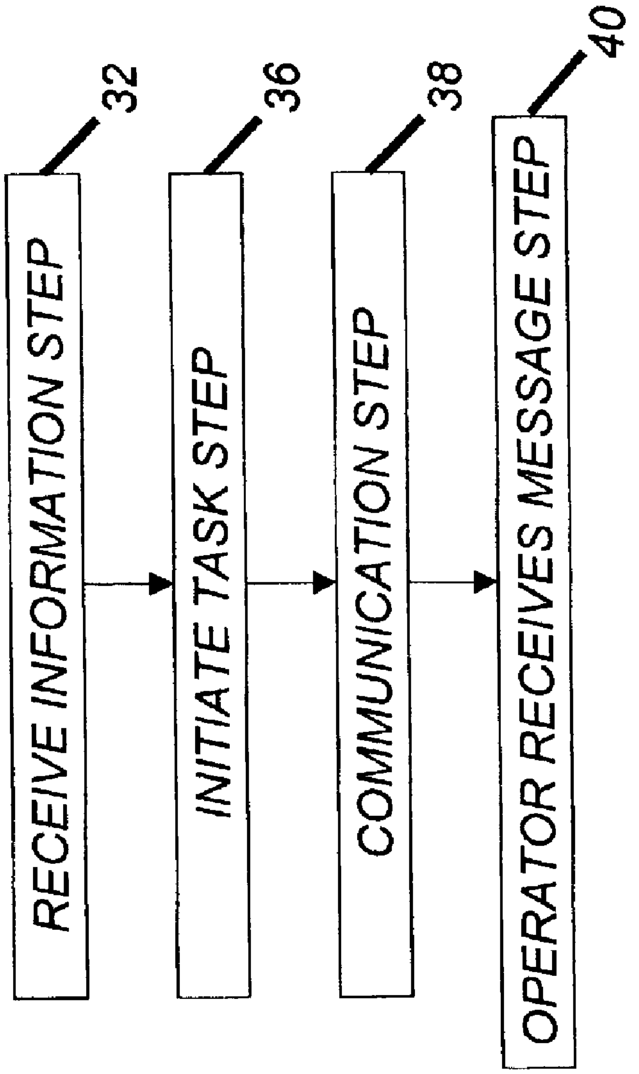
FIG. 4 is a flowchart illustrating the operation of the present invention.

FIG. 4 shows the operation of the inventive appliance as a series of steps. In the receive information step 32, the appliance's computer 2 (shown in FIG. 3) receives information from the human operator. The computer 2 either is directly given the operator contact information or obtains it from a database 14. Referring again to FIG. 4, the initiate task step 36 follows the step 32. In the initiate task step 36, the appliance begins its task. The communication step 38 occurs when at a predetermined time the appliance's computer 2 sends a communicative message 12 to the human operator using the transmitter 8 and the portable communication device 18, as shown in FIG. 3. Referring again to FIG. 4, the operator receives message step 40 occurs when the human operator receives the message 12 from the appliance's computer 2 over the portable communication device 18.

Figure 5:
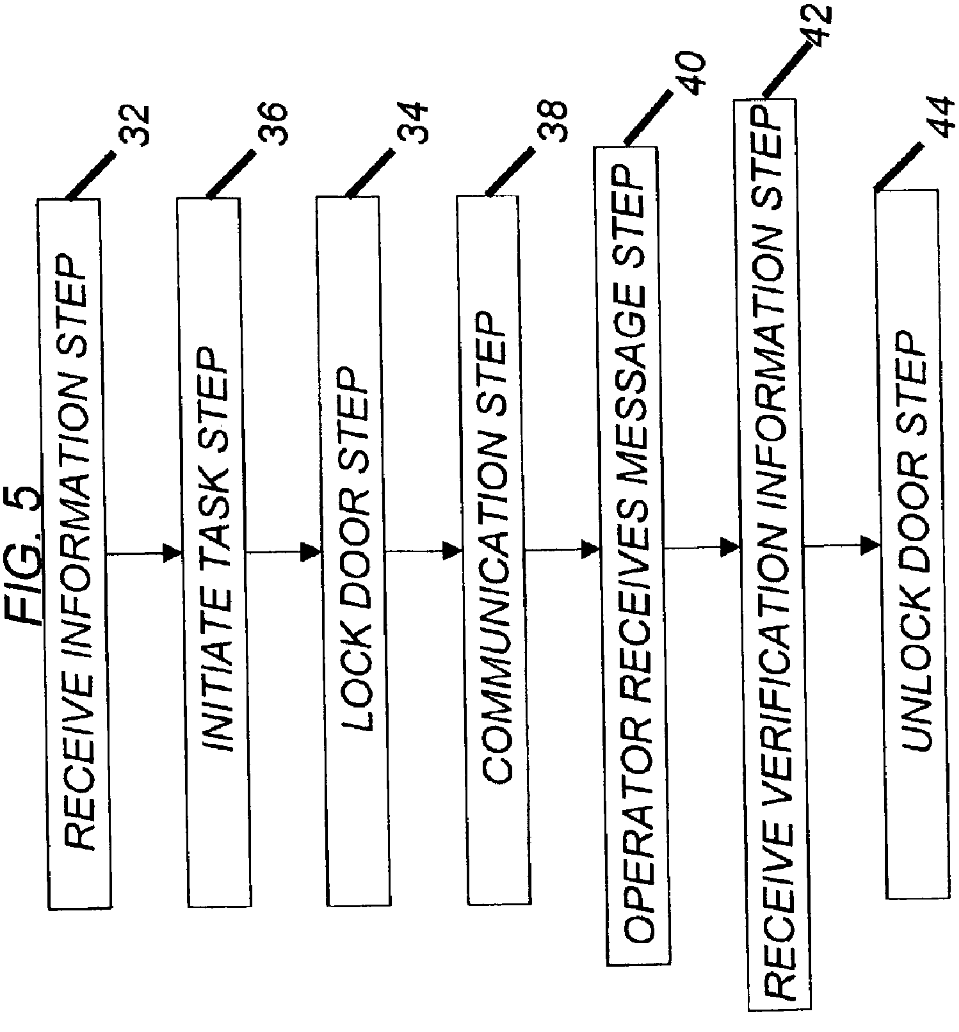
FIG. 5 is a flowchart illustrating to operation of an alternative embodiment of the present invention.

FIG. 5 shows a flow diagram representing an additional alternative embodiment of the present invention. In the receive information step 32, the appliance's computer 2 (shown in FIG. 3) receives an operator identification number 24 from the human operator. The computer 2 either is directly given the operator contact information or obtains it from a database 14. Referring again to FIG. 4, the initiate task step 36 follows the step 32. At the task initiation, the appliance's locking door 106 (shown in FIG. 2) locks in the lock door step 34. The order of steps 34 and 36 may be reversed. The locking door 106 prevents the theft of the human operator's possessions that have been placed in the appliance. This is especially important because the present invention enables the human operator to distance him or her self from the appliance, thus leaving the appliance unattended. With a locking door 106, the contents of the unattended appliance may be less susceptible to theft. The communication step 38 occurs when at a predetermined time the appliance's computer 2 sends a communicative message 12 to the human operator using the transmitter 8 and the portable communication device 18, as shown in FIG. 3. In the operator receives message step 40, the human operator receives the message 12 from the appliance's computer 2 over the portable communication device 18, as previously described. The human operator then returns to the appliance, and a receive verification information step 42 is executed as the human operator again presents an operator identification number. In the case where the two operator identification numbers match, then the unlock door step 44 takes place, where the appliance unlocks the door allowing the human operator to have access to the contents of the appliance. If the second operator identification number does not match the first (for example in the case of an attempted thievery by a human operator impostor), then the unlock door step 44 will not take place and the human operator impostor will not have access to the appliances's contents. The unlock door step 44 will also occur when the second operator identification number matches a master identification number. This provision ensures that the appliance's owner will be able to unlock the appliances locking door 106 in the case where the human operator cannot be found.

The operator identification number could also be used in an automated billing system in a laundromat facility as described in U.S. Pat. No. 5,424,940.

The present invention describes an appliance that notifies a human operator at a predetermined time in order that the human operator will have knowledge of the appliance's progress with its task. The inventive appliance facilitates the ability of human operators to distance themselves from the appliances, possibly for shopping. Thus, the present inventive appliance placed within walking distance (or within the same building) from a retail establishment (possibly selling food or refreshments such as ice cream or coffee) will stimulate the revenue of the retail establishment, as the human operators will be more likely to travel some distance from the appliance while it is accomplishing its task.

PARTS LIST

| | |
|---|---|
| 2 | computer |
| 4 | input device |
| 6 | operator contact information |
| 8 | transmitter |
| 14 | database |
| 18 | portable communication device |
| 24 | operator identification number |
| 26 | auxiliary information |
| 32 | receive information step |
| 34 | lock door step |
| 36 | initiate task step |
| 38 | communication step |
| 40 | message reception step |
| 42 | receive verification information |
| 44 | unlock door step |
| 102 | start button |
| 104 | dial |
| 106 | locking door |

What is claimed is:

1. An appliance capable of performing a task initiated by a human operator, comprising a. an input device for receiving operating contact information for sending a message to a human operator wherein the operator contact information is supplied by the human operator prior to the initiation of the appliance's task, and for receiving an operator identification number;

b. a database for storing and associating the operator contact information and the operator identification number;

c. a computer for retrieving the operator contact information associated with the operator identification number;

d. a transmitter that uses the operator contact information to communicate a message at a predetermined time relative to the duration of the appliance's task from the appliance to the human operator; and e. a locking door that unlocks when a first operator identification number acquired before the appliance's task is initiated is matched with a second operator identification number, wherein the second operator identification number is supplied by the human operator to the input device after the initiation of the appliance's task.

2. The appliance of claim 1, wherein the input device is magnetic card reader and the operator identification number is stored on a magnetic card.

3. The appliance of claim 1, wherein the input device is a keypad.

4. The appliance of claim 1, wherein the predetermined time is 1 to 10 minutes before the appliance's task is complete or at the conclusion of the appliance's task.

5. The appliance of claim 1, further including a portable communication device for receiving the message communicated by the transmitter.

6. The appliance of claim 5, wherein the portable communication device is a cellular telephone.

7. The appliance of claim 6, wherein the message is a pre-recorded or computer synthesized voice.

8. The appliance claim 1, wherein the operator contact information is an email address and the communicates the message via an email message.

9. The appliance of claim 1, wherein the operator contact information is a telephone number, and the appliance is a clothes washer or dryer.

* * * * *